United States Patent [19]

Hurst

[11] 4,171,065

[45] Oct. 16, 1979

[54] CIRCUITRY AND SYSTEM FOR CONTROLLING MULTI-USE ARTICLE DISPENSING CELLS

[76] Inventor: Kerney J. Hurst, 507 Eagle Dr., Pineville, La. 71360

[21] Appl. No.: 747,956

[22] Filed: Dec. 6, 1976

[51] Int. Cl.[2] ........................ B65G 47/44; B65B 57/20

[52] U.S. Cl. ........................................ 221/7; 222/14; 133/8 R

[58] Field of Search ............................ 221/2, 7, 9, 13; 133/8 R; 53/59 R, 78; 222/14–17, 21

[56] References Cited

U.S. PATENT DOCUMENTS

| | | | |
|---|---|---|---|
| 2,632,588 | 3/1953 | Hoar | 221/13 X |
| 2,680,051 | 6/1954 | James | 221/13 |
| 3,033,417 | 5/1962 | Van Meer | 221/13 |
| 3,054,864 | 7/1962 | Hurst et al. | 221/7 |
| 3,170,627 | 2/1965 | Pearson et al. | 221/7 X |
| 4,013,192 | 3/1977 | Pillon | 221/7 |

*Primary Examiner*—Joseph J. Rolla
*Attorney, Agent, or Firm*—Rose & Edell

[57] ABSTRACT

A circuit and system is presented for controlling operation of a cell or hopper for dispensing controlled quantities of similarly shaped but different small articles. Copending patent application Ser. No. 533,255 filed on Dec. 16, 1974, by Hurst et al., discloses an article dispensing system providing a plurality of rotatable dispensing hoppers or cells each for dispensing during rotation a different article, specifically a drug tablet or capsule; the number to be dispensed being freely selectable. The present invention provides a modification of such system permitting a single cell to dispense several different items without fear of intermixing items. Pursuant thereto, a cell is filled with more articles than required and the system put into operation. The circuitry for each cell terminates dispensing of an article when the selected number of articles have been delivered to a dispensing chute. Upon removal of the counted articles from the chute, the cell is again rotated until it is sensed that all articles are dispensed. The cell is then rendered inoperative. Upon removal of the excess articles from the chute, the cell is put in a standby position for further operation as desired.

9 Claims, 2 Drawing Figures

CIRCUITRY AND SYSTEM FOR CONTROLLING MULTI-USE ARTICLE DISPENSING CELLS

BACKGROUND OF THE INVENTION

The present invention relates to an apparatus for dispensing freely predeterminable numbers of many different articles from many different article dispensing cells or hoppers under control of a single master counter and more particularly to such a system wherein several of said different types of articles may be dispensed at different times from a single cell with minimum danger of mixing the articles.

In the aforesaid copending patent application a plurality of cells or hoppers are provided each for dispensing a different article (drug). A single master control unit is provided for said plurality of cells and includes a presettable counter for determining the number of tablets or capsules to be dispensed.

In operation, the master control unit is turned on and the number of items to be dispensed is inserted into the counter. In response thereto a voltage is applied to all cells for starting each cell. Each cell has a start switch. The start switch on the cell containing the desired drug is now activated and that cell begins to rotate to dispense drugs. Energization of one cell causes the starting voltage to be removed from all cells so that only the selected cell operates; the circuit being maintained through a holding circuit.

When the desired number of items have been dispensed, the counter is automatically reset to zero, the starting voltage is reapplied to all cells and another cell may be selected and run.

The above apparatus is completely satisfactory and the present invention relates to changes in the circuitry of certain drug cells to permit selected cells to be used for several different drugs. Specifically, it has been found that with most capsules the exterior is such that a cell is not contaminated by the drug. This fact coupled with the additional facts that certain capsule cells can accomodate a range of capsule sizes and that the economics are such that there exists a strong desire to reduce the number of cells required has led to the use of the several of the capsule cells of the aforesaid application for multiple drugs; i.e., multi-use cells.

It is an object of the present invention to provide circuitry for use with multi-use drug cells utilized in automatic drug dispensing devices.

Yet another object of the present invention is to provide combined mechanical and electrical features in a multi-use cell to substantially eliminate the danger of mixing capsules, etc., of different drugs.

It is another object of the present invention to provide circuitry for such multi-use cells which after a desired number of items have been dispensed, the cell cannot be restarted until the dispensed items have been removed from the output chute of the cell.

It is yet another object of the present invention to provide circuitry for a multi-use cell in which upon removal of dispensed items, the cell is automatically activated to remove all excess items in the cell after which the cell is ready for further use.

SUMMARY OF THE INVENTION

The present invention permits certain of the capsule dispensing cells of the aforesaid application to be employed to dispense several different drugs. Specifically, only three multi-use cells are required to dispense all capsules dispensable by machine.

As a result of such use, the present invention prescribes certain safety features and the interaction of the mechanical and electrical apparatus to insure that such are observed.

Specifically, multi-use of cells required that all possibility of mixing of drugs be eliminated. In order to accomplish this the present invention renders the multi-use cell inoperative after the desired number of capsules have been delivered to an output chute. Removal of the dispensed prescription from the chute reactivates the cell but only to continue dispensing until all remaining (excess) capsules in the cell are dispensed. Again, in order to eliminate the possibility of a cell being requested to dispense a new drug before the excess items are removed from the dispenser chute, the cell is rendered inoperative until the excess items are removed from the chute. Two lights are provided one to indicate when a prescription has been counted out and one to indicate when the excess capsules are all in the chute and awaiting removal.

DESCRIPTION OF THE PREFERRED EMBODIMENT

Figure 1:
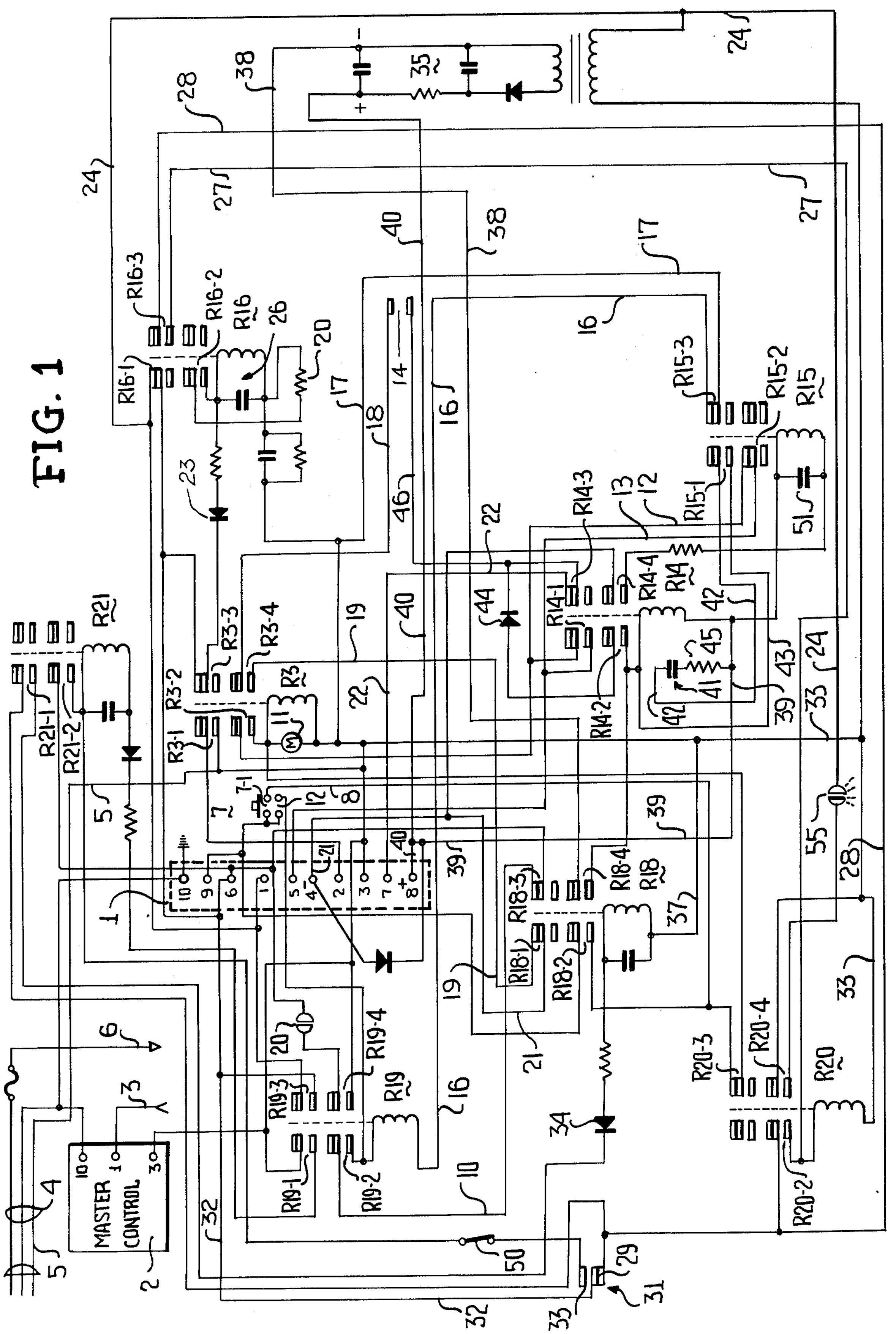
FIG. 1 of the accompanying drawing is a diagram of the circuitry of each of the multi-use drug cells.

Referring now specifically to FIG. 1 of the accompanying drawing, there is illustrated the circuitry of a multi-use drug cell which is completely compatible with the master control unit and other individual drug cells of the aforesaid copending patent application Ser. No. 533,255.

Figure 2:
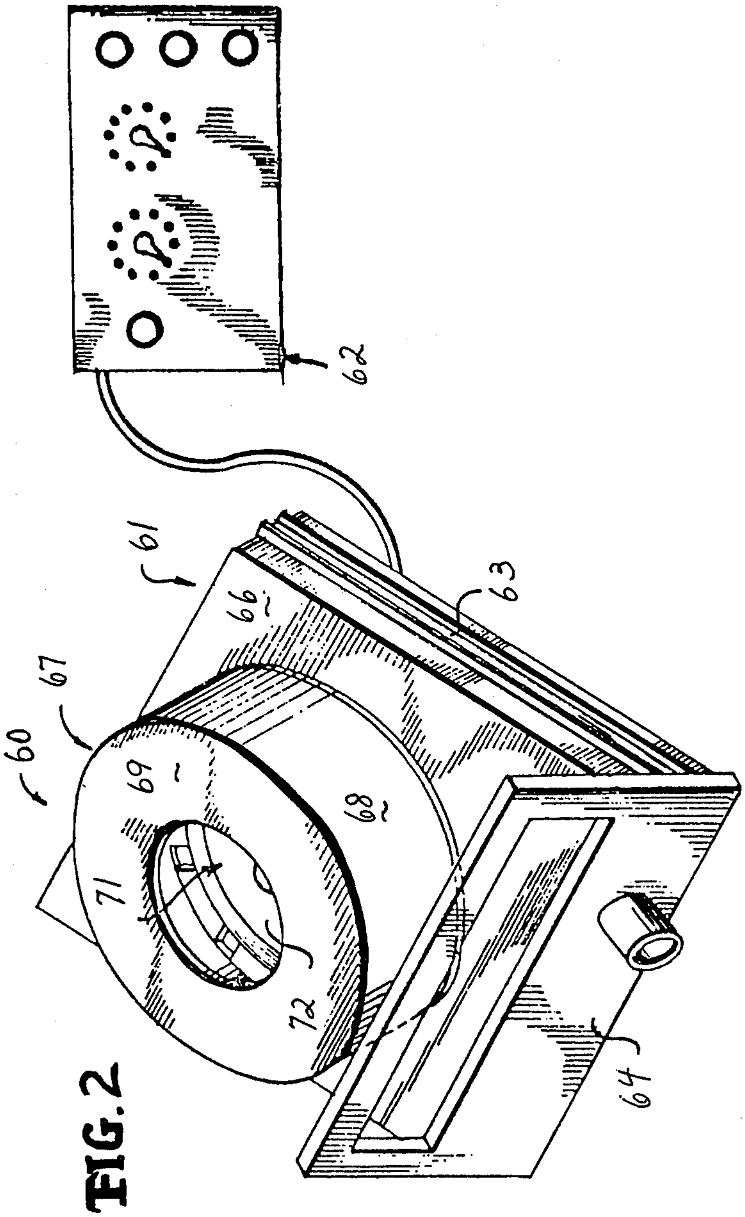
FIG. 2 is a perspective view in elevation of the article holding hopper and its support connected with a counting control unit.

Referring to FIG. 2, a drug cell 60 includes an article holding and article dispensing means 61 connected with a counting control means 62. The article holding means 61 is substantially box-like in general configuration adapted to slide into and out of a supporting cabinet, not shown, by sliding rails 63 wherein a front panel 64, forming a cover or front wall of the cabinet, closes an opening in the cabinet to provide a pleasing appearance. The configuration of the article holding means 61 is shown by way of example wherein a plurality of such holding means are positioned in vertical juxtaposed rows so that each of a plurality of such article holding means contains a like plurality of different tablets or capsules. Furthermore, it is desirable that the upper surface of the article holding means form an inclined support 66. This support 66 is preferably of plastic to reduce frictional resistance to tablets or capsules rotated across its surface.

A hopper 67 is centrally positioned on the support 66. The hopper 67 is generally cylindrical and is characterized by a vertical wall 68 turned inwardly to form a top 69 having a central access opening 71. A circular disk 72 forms the bottom of the hopper.

The cell of FIG. 1 (hereinafter "the accompanying figure") is provided with a terminal block 1 connected via a standard terminal connector employed in the aforesaid application to the master control unit 2. For ease of explanation certain additional connections are illustrated in the accompanying drawing, although as will become apparent, these connections actually are made through the terminal block 1. One set of additional connections not shown are made through the terminal block 1 to the master control unit 2. These connections are from the pin 3 of the control 2 to terminal 3 of the terminal block 1, from terminal 1 of the master control 2 to a lead 3 (to be defined more fully momentarily). Further additional connections illustrated are from the ground connection of the input conductor 4 to the terminal 10 of the connector block and the connection of the white (or low) lead of the input connector 4 to the terminal 3 of the terminal block 1.

For purposes to be described subsequently the black (hot) lead 6 of the power cable 4 is connected to pin 6 of the terminal block 1 of the first of the multi-use drug cells. Pin 6 is connected to pin 1 of the first cell via normally closed contacts R16-1 of relay R16. It should be noted that contacts R16-1 are paralleled by contacts R19-3 of relay R19. (All relays are illustrated in their de-energized condition and are de-energized at the start of a cycle). Pin 1 of the first cell is connected to pin 6 of the second multi-use cell. Pin 1 of the second cell is connected to pin 6 of the third cell and pin 1 of the third cell is connected to conductor 3, previously indicated as connected to terminal 1 of the master control 2.

When the master control unit is turned on and a desired count of pills is placed in the master counter, voltage is applied from the master control unit, ac voltage, to terminals 5 and 9 of all cells including the multi-use cells. To start a multi-use cell, start push-button 7 is depressed and an upper set of contacts 7-1 applies voltage to a lead 8 connected to the upper terminal of a motor 11. The lower terminal of motor 11 is connected to ground via terminal 3 of terminal block. In parallel with motor 11 is relay R3 which closes contacts R3-2 thereby establishing a holding circuit for the relay through contacts R15-2 of relay R15. This holding circuit is established via lead 12 to the contacts R15-2 and conductor 13 to terminal 5 on terminal block 1 which has high voltage applied thereto at this time. Energization of relay R3 also closes contacts R3-1 to connect the low voltage lead 5 of the input cable 4 to terminal 2 of the block 1. The terminal 2 is connected to the master counter of the master control circuit and energizes a relay in such circuit so that the counter circuit will respond subsequently to the operation of a microswitch 14. The microswitch 14 is employed to count capsules as they are discharged from the cell.

Closing of the start switch 7 also closes a lower set of contacts 7-2 which connects the operating voltage on terminal 9 of the terminal block 1 through the contacts 2 to the upper end of the coil of relay R19, the lower end being connected via a lead 16, contacts R15-3 of the relay R15 and via the lead 17 to the low side 5 of the input cable 4. A holding circuit is established via contacts R19-2 lead 10, contacts R18-3 of relay R18 and lead 15 to terminal 6. Contacts R19-4 applies voltage across bulb 20 to indicate a prescription is being filled from that cell.

It should be noted that when the relay contacts R3-1 close and apply ground to the terminal 2, the master control unit removes high voltage on the terminal 9 of all of the terminal blocks 1 so that all of the start buttons 7 are thereafter ineffective not only on the multi-cell units, but all drug cell units of the apparatus. Since only one master counter is available, only one cell may operate at a time.

As previously indicated, upon the operation of the start switch 7, the motor 11 is energized and rotates the drug cell so that capsules are dispensed. As each capsule drops from its cell into the output chute, the microswitch 14 is closed. The upper contact of microswitch 14 as illustrated in the accompanying figure, is connected via lead 18 through now closed relay contacts R3-4, lead 19, contacts R18-1 of relay R18, and lead 21 to terminal 4 of the terminal block 1. The lower contact of microswitch 14 is connected via lead 46 through contacts R14-3 of relay 14 and lead 22 to terminal 7 of the terminal block 1.

As previously indicated, contacts R3-1 of the relay R3 energized the master counting relay in the master counter 2 so that closing of microswitch contacts 14 across terminals 4 and 7 of the terminal block 1 causes incrementing of the count in the master counter by 1 for each closing of the microswitch 14. The system continues to function as indicated until the count accumulated in the master counter 2 reaches the preset count at which time voltage is removed from terminal 5 of the connector block 1. The motor 11 is de-energized as is the relay 3, the system is halted and d.c. is removed from pins 4 and 8 by the master control.

Relay R16 has the lower end of its coil, as illustrated, connected permanently to the low side 5 of the power cable 4, and the upper end of the relay is connected via diode 23, contacts R3-3 of relay R3 contacts R16-1 of relay 16 and lead 24 to terminal 1 of the connector block 1.

Upon release of relay R3 its contacts R3-3 close so that the coil of relay R16 is energized via the foresaid circuit. Energization of the relay R16 now opens contacts R16-1 removing voltage from the relay. However, the diode 23 has caused the capacitor 26 to become charged so that the relay 16 is maintained energized by discharge of the capacitor through the relay coil via contacts R16-2 which are now closed. The discharge time of the capacitor 26 is determined by a series connected resistor 20; the time delay being chosen so that the functions to now be described occur before the relay becomes de-energized.

Energization of the relay R16 closes its contacts R16-3 to connect the upper end of relay R20 via lead 27 through contacts R16-3 to lead 28 connected through lower contacts 29 of a reed switch 31 to lead 32 which is connected to terminal 6 of the terminal block 1. Relay 20 is energized since the lower end of the relay is connected directly to ground via lead 33. Energization of the relay R20 closes its holding contacts R20-2 so that upon the de-energization of relay 16 the relay 20 is maintained energized. Energization of relay 20 also closes contacts R20-4 to energize excess light 55 to indicate excess in the hopper and opens its contacts R20-3 so that the motor 11 cannot be restarted through start switch 7 until the relay R20 is released which occurs upon removal of the prescription from the drop-out chute of the multi-use drug cell.

Upon opening of the door to the drop-out chute which permits release of the counted prescription from the chute, the reed switch 31 opens its lower contacts 29 and closes its upper contacts 33. Closing of the upper contacts of the switch 31 connects the ac voltage of terminal 6 of terminal block 1 via the upper contacts of the switch 33 and a lead 34 to the upper end of the coil of relay R21. The lower end of that coil is connected via contacts R19-1 of the relay R19 to the terminal 3 so that the relay R21 is energized. Contacts R21-2 which are in parallel with the upper contacts of reed switch 33 are closed upon energization of their associated relay and the relay will remain energized until subsequent action of other members of the circuit. Energization of the relay R21 also closes its contacts R21-1 so that when the door is again closed and the lower contacts 29 of the reed switch 31 are again closed, relay R18 is energized momentarily; the coil of relay 18 being connected to the terminal 6 via the contacts R21-1 and the lower contacts of the reed switch 31.

The relay R18 is energized only momentarily for reasons described, subsequently. Energization of the relay R18 closes its contacts R18-2 the upper lead of which is connected to terminal 9. When the master counter counted out and automatically reset terminal 9 had ac voltage reapplied, and thus a circuit is completed from the terminal 9 via the contacts R18-2, contacts R20-3 and to the upper terminal of the motor 11, and the motor 11 is again energized to rotate the cell to dispense the excess pills in the hopper.

Energization of the relay R18 also closed its contacts R18-4 which placed relay R14 across dc power supply 35; the upper contact of R18-4 being connected via lead 38 to the low voltage side of the aforesaid power supply, while the lower end of the coil relay R14 is connected to terminal 8 via a lead 39 and from terminal 8 to the high side of the supply 35 via lead 40.

It should be noted at this time that the relay R19 is de-energized when relay R18 is energized and opens its contacts R18-3 in the holding circuit of relay R19. Opening of contacts R19-1 de-energizes relay R21 which de-energizes relay R18 via contact R21-1; thus providing the momentary operation of R18. De-energization of relay R19 also de-energized the prescription light 20.

The counter in the master control no longer responds to further actuation of the microswitch 14 due to opening of contacts R14-3 of relay R14 in the circuit to pin 7 of the terminal block 1.

Energization of the relay R14 produces energization of the relay R15 through contacts R14-4 of relay R14. It will be noted that when relay R14 is energized it closes contacts R14-1 to parallel contacts R15-2 in the holding circuit of the relay R3. Thus energization of R15 does not stop operation of the motor 11 which is continued through the holding circuit established through contacts R14-1.

The motor 11 is now running on the excess cycle, and with the contacts R14-2 closed, microswitch 14 is connected across the d.c. voltage across pins 4 and 8 of the block 1; tracing from terminal 8 of terminal block 1 via lead 39 and through resistor 45, capacitor 41 via lead 42, contacts R15-1 of the relay R15, lead 43 through contacts R14-2, diode 44, lead 46 to microswitch 14, and thence via lead 18, contacts R3-4 of relay 3, lead 19, contacts R18-1 and lead 21 to terminal 4. The purpose for this connection is to recharge capacitor 41 each time microswitch 14 is closed during the excess run cycle. The reason for this is that the capacitor 41 is in the holding circuit of relay R14. More particularly, it will be noted that when relay 18 is initially energized, its contacts R18-4 energize relay R14. The relay R18 is active only momentarily and therefore the contacts R18-4 open. A holding circuit for R14 is established through its contacts R14-2 and through the microswitch 14. The capacitor 41 is initially charged and has a time delay of approximately 5 seconds when completely charged. The motor 11 is running. If no pills drop out during a five second interval, relay R14 becomes de-energized due to discharge of the capacitor. However, if capsules are being dispensed to the chute, microswitch 14 is closed before the lapse of five seconds and the capacitor 41 is recharged from the power supply 35. The recharging circuit is such that the delay from the capacitor 41 is about 3 seconds, so that if within 3 seconds additional capsules are discharged and detected by the microswitch, the relay R14 stays energized. A 3 second lapse of time is assumed to be the maximum time during which any capsule in the cell would be dispensed. If none are dispensed the relay R14 is de-energized and de-energizes the relay R15.

The purpose of the relay R15 is to open the holding circuit on relay R19 so that the relay 19 remains de-energized during the excess cycle. Relay R15 serves the further function of establishing the charging circuit for the 500 microfarad capacitor of relay R14 so that the circuit is operative only during the excess discharge cycle.

Upon completion of the excess cycle, the relay R14 de-energizes opening the holding circuit on the relay R15 so that the relay 15 also de-energizes.

It will be noted that the relay R15 has a capacitor 51 connected across its coil. This capacitor is large and delays de-energization of the relay R15 beyond the de-energization of the relay R14. In this way its contacts R15-2 in the holding circuit of relay R3 and motor 11 are held open while the contacts R14-1 of relay R14 open. Thus the holding circuit of the relay R3 is opened and the relay is de-energized, causing the motor 11 to be de-energized. As before, de-energization of the relay R3 momentarily energizes the relay R16 which in turn energizes the relay R20. The energization of the relay R20 energizes an excess bulb light 55 to be illuminated to indicate to the druggist or clerk that the excess material may be removed from the cell.

Energization of relay R16 opens contacts R16-1 breaking the circuit between pins 1 and 6 of the terminal block 1 and signals the master control that the cycle is complete. Opening of the chute door again actuates the reed switch 31 and de-energizes the relay R20, turning off the light and re-establishing the condition of the circuit as it existed prior to initial actuation of the drug cell.

In summary, upon completion of a count, the motor is de-energized (loss of voltage on terminal 5) and cannot be restarted (contacts R20-3 open) until the capsules counted out into the drug drop-out chute have been removed. When they are and the chute door is closed, relay R20 is de-energized as is relay R19. Relay R20 re-establishes the holding circuit of motor 11 through its contacts R20-3 which together with contacts R18-2 of now energized relay R18 restart the motor 11 for the excess cycle. Relays R14 and R15 are energized and the excess cycle continues until a 3 second interval between pill droppings has occurred. At this time relay R14 de-energizes and since relay R15 is still energized relay R20 is de-energized. Relay R16 is again momentarily energized and energizes relay R20 holding open the start circuit of motor 11 even after relay R15 de-energizes. Removal of the excess of the chute and reclosing of the chute door de-energizes relay R20 placing the cell on standby further operation.

A switch 50 is placed in lead 34 and is referred to as the prepack switch. If it is desired to prepack a drug in prescribed quantities, for instance, packets of 50 capsules each; the switch 50 is opened. Opening of switch 50 eliminates the excess cycle since relay R21 cannot be energized. With the switch 50 open and say 50 inserted in the master counter, the operator after each removal of the prescribed count punches the start button and the apparatus counts out another 50 capsules.

It should be noted that although the circuitry of the present invention utilizes relay logic, solid state logic may be employed and in fact is employed in the apparatus currently being marketed.

Obviously the invention is susceptible to changes or alterations without defeating its practicability, therefore, we do not wish to be confined to the preferred embodiment shown in the drawings and described herein.

I claim:

1. Control circuitry for a dispensing apparatus for dispensing items to an output location, said control circuitry operating in conjunction with a master control unit including an article counter and associated circuitry; said control circuitry including start means for initiating operation of said dispensing apparatus to affect dispensing of articles to be dispensed, means for generating a signal for incrementing the article counter as each article is dispensed, stop means responsive to a signal indicating the article counter has achieved a desired count to terminate operation of said dispensing apparatus and render said circuitry inoperative to reinstate operation of said dispensing apparatus, means for detecting removal of dispensed items from said output location and further means responsive to said means for detecting for permitting operation of said dispensing apparatus and for disabling said stop means.

2. The combination according to claim 1 further comprising a switch means having first and second states, and wherein said further means re-initiates operation of said dispensing means with said switch means in said first state and re-enables only said start means with said switch means in said second state.

3. The combination according to claim 1 wherein said further means re-enables said start means.

4. The combination according to claim 3 wherein said further means also re-initiates operation of said dispensing apparatus.

5. The combination according to claim 4 further comprising excess cycle means responsive to means for generating a signal for maintaining operation of said dispensing means only so long as such signal is received within prescribed successive time intervals and terminating operation of said dispensing means upon failure to receive such signal within said prescribed successive time intervals and disabling said start means.

6. The combination according to claim 5 wherein said further means re-enables said start means upon removal from said output location of items dispensed during the excess cycle.

7. The combination according to claim 6 wherein said further means re-enables said stop means upon removal from said output location of items dispensed during the excess cycle.

8. The method of reducing the hazard of intermixing different items to be dispensed at different times from a common dispensing apparatus comprising the steps of establishing a number of items to be dispensed to a given location from an apparatus usually containing more items than the number to be dispensed, initiating delivering of the items to the given location, terminating dispensing of the items when the established number have been dispersed and concurrently preventing initiation of delivery of further items, re-establishing delivery of the remaining items in the dispensing apparatus upon withdrawal of the previously dispensed items from a given location, terminating dispensing when no further items remain in said apparatus and concurrently preventing re-initiation of operation of the apparatus and again rendering said apparatus capable of dispensing upon removal of the remaining items from a given location.

9. Control circuitry for a dispensing apparatus for dispensing items to an output location, means for establishing a predetermined quantity of items to be dispensed, said control circuitry including start means for initiating operation of said dispensing apparatus to affect dispensing of items to be dispensed, means for generating a signal when the predetermined quantity has been achieved, stop means responsive to said signal to terminate operation of said dispensing apparatus and render said circuitry inoperative to reinstate operation of said dispensing apparatus, means for detecting removal of dispensed items from said output location and further means responsive to said means for detecting for permitting operation of said dispensing apparatus and for disabling said stop means.

* * * * *